United States Patent
Moll et al.

(10) Patent No.: US 9,440,196 B2
(45) Date of Patent: Sep. 13, 2016

(54) COMPOSITE MEMBRANE

(71) Applicant: Dow Global Technologies LLC, Midland, MI (US)

(72) Inventors: David J. Moll, Midland, MI (US); H. C. Silvis, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 82 days.

(21) Appl. No.: 14/372,339

(22) PCT Filed: Feb. 12, 2013

(86) PCT No.: PCT/US2013/025655
§ 371 (c)(1),
(2) Date: Jul. 15, 2014

(87) PCT Pub. No.: WO2013/126238
PCT Pub. Date: Aug. 29, 2013

(65) Prior Publication Data
US 2014/0363572 A1    Dec. 11, 2014

Related U.S. Application Data

(60) Provisional application No. 61/601,061, filed on Feb. 21, 2012.

(51) Int. Cl.
| | | |
|---|---|---|
| B01D 69/12 | (2006.01) | |
| B01D 67/00 | (2006.01) | |
| B01D 71/80 | (2006.01) | |
| B01D 71/56 | (2006.01) | |
| B01D 71/28 | (2006.01) | |
| B01D 71/48 | (2006.01) | |

(52) U.S. Cl.
CPC ........... *B01D 69/125* (2013.01); *B01D 67/003* (2013.01); *B01D 67/0006* (2013.01); *B01D 67/0034* (2013.01); *B01D 71/80* (2013.01); *B01D 71/28* (2013.01); *B01D 71/48* (2013.01); *B01D 71/56* (2013.01); *B01D 2323/30* (2013.01); *B01D 2323/32* (2013.01); *B01D 2323/34* (2013.01); *B01D 2323/40* (2013.01)

(58) Field of Classification Search
CPC .................................................. B01D 69/125
See application file for complete search history.

(56) References Cited

U.S. PATENT DOCUMENTS

| | | | |
|---|---|---|---|
| 4,096,099 A | | 6/1978 | Koyama et al. |
| 4,224,415 A | | 9/1980 | Meitzner et al. |
| 4,277,344 A | | 7/1981 | Cadotte |
| 4,960,517 A | * | 10/1990 | Cadotte .......... 210/639 |
| 5,693,227 A | * | 12/1997 | Costa ............ 210/650 |
| 6,479,007 B1 | * | 11/2002 | Greenberg ......... B01D 67/0018 264/216 |
| 6,878,278 B2 | | 4/2005 | Mickols |
| 7,347,953 B2 | | 3/2008 | Black et al. |
| 7,438,193 B2 | | 10/2008 | Yang et al. |
| 7,572,669 B2 | | 8/2009 | Tuominen et al. |
| 7,815,987 B2 | | 10/2010 | Mickols et al. |
| 7,905,361 B2 | | 3/2011 | Niu et al. |
| 7,964,107 B2 | | 6/2011 | Millward |
| 2006/0207930 A1 | * | 9/2006 | Yeager ................ B01D 69/125 210/490 |
| 2007/0080107 A1 | | 4/2007 | Yang et al. |
| 2008/0230514 A1 | | 9/2008 | Park et al. |
| 2009/0200646 A1 | | 8/2009 | Millward et al. |
| 2009/0208842 A1 | | 8/2009 | Harada et al. |
| 2009/0239381 A1 | | 9/2009 | Nishimi et al. |
| 2010/0036009 A1 | | 2/2010 | Konishi et al. |
| 2010/0292077 A1 | * | 11/2010 | Hillmyer et al. ............. 502/402 |

FOREIGN PATENT DOCUMENTS

| | | |
|---|---|---|
| JP | 11080414 | 7/1989 |
| WO | 2008103599 | 8/2008 |

OTHER PUBLICATIONS

Myungeun Seo, et al., Cross-linked Nanoporous Materials from Reactive and Multifunctional Block Polymers, Macromolecules, 2011, 44 (23), pp. 9310-9318.

* cited by examiner

*Primary Examiner* — Alex A Rolland

(57) ABSTRACT

A method of making a composite membrane comprising the steps of forming a discriminating layer upon a surface of a porous support by sequentially applying immiscible coating solutions upon the support, wherein one coating solution comprises a crosslinking agent and another coating solution comprises a block copolymer, and the block copolymer comprises sacrificial segments and durable segments including reactive pendent groups which react with the crosslinking agent and form a crosslinked matrix comprising microdomains of the sacrificial segments, and removing at least a portion of the sacrificial segments to yield pores.

7 Claims, No Drawings

COMPOSITE MEMBRANE

FIELD

The present invention is directed toward composite membranes including a porous support and a discriminating layer.

INTRODUCTION

Composite membranes include a selective barrier or "discriminating layer" located upon an underlying porous support. While the support provides the membrane with mechanical integrity, it offers little resistance to flow. In most applications, the primary means of separation is provided by the discriminating layer. A representative class includes FT-30™ thin film composite (TFC) membranes invented by Cadotte, see U.S. Pat. No. 4,277,344. With such membranes, a thin film crosslinked polyamide layer is formed upon a porous support by an interfacial polymerization between polyfunctional amine (e.g. m-phenylene diamine (mPD)) and polyfunctional acyl halide monomers (e.g. trimesoyl chloride (TMC)). The monomers are sequentially coated upon the support from immiscible solutions and form a thin crosslinked polyamide at the interface between the coating solutions. See also U.S. Pat. No. 6,878,278; U.S. Pat. No. 7,815,987 and U.S. Pat. No. 7,905,361.

Self-assembling block copolymers have been used to form films for a variety of applications. The block copolymer includes durable segments that form a continuous phase and sacrificial segments that form phase separated microdomains. The sacrificial segments are subsequently etched away to form relatively uniform, mono-dispersed, microsized pores. Examples of such films are described in: U.S. Pat. No. 4,096,099, U.S. Pat. No. 7,347,953, U.S. Pat. No. 7,572,669, U.S. Pat. No. 7,964,107, US 20080230514, US 20090200646 and JP 11-080414. Self-assembling block copolymers have also been considered for use in membrane-related applications. Examples are described in: U.S. Pat. No. 7,438,193, US 20090208842, US 20090239381, US 20100292077 and US 20100036009. See also Myungeun Seo, Mark A. Amendt, and Marc A. Hillmyer, Cross-linked Nanoporous Materials from Reactive and Multifunctional Block Polymers, *Macromolecules,* 2011, 44 (23), pp 9310-9318.

To be useful in many composite membrane applications, the discriminating layer must form a strong union with the underlying support. This requirement has limited the use of self-assembled block copolymers as discriminating layers—particularly in applications where the membrane is exposed to high pressure, backwashing or repetitive motion.

SUMMARY

The present invention includes composite membranes and methods for making the same including the formation of a discriminating layer upon a surface of a porous support. The method includes the steps of sequentially applying immiscible coating solutions upon the support, wherein one coating solution comprises a crosslinking agent and another coating solution comprises a block copolymer, and wherein the block copolymer comprises sacrificial segments, and durable segments including reactive pendent groups which react with the crosslinking agent and form a crosslinked matrix comprising micro-domains of the sacrificial segments. The sacrificial segments are removed from the crosslinked matrix to yield pores.

Crosslinking improves one or more of the mechanical, thermal and chemical stabilities of the matrix. By forming a crosslinked matrix upon the support, the reactants are able to partially penetrate the surface of the support resulting in a discriminating layer having a strong union with the support.

DETAILED DESCRIPTION

The invention includes a method for making a composite membrane including the step of forming a discriminating layer upon a surface of a porous support. The selection of porous support is not particularly limited and various configurations (e.g. flat sheet, disc, hollow fiber, tubular, porous fiber, etc.) and compositions may be used. Representative polymeric materials include homopolymers, copolymers and polymer blends, including but not limited to: polyamides; fluorinated polymers, e.g. polyvinylidene fluoride; polyolefins including polyethylene and polypropylene; and poly(aryl ethers) including poly(aryl ether) sulfones, ketones, phosphine oxides and nitriles, polyamides, etc.). Techniques for creating porosity within the support are not particularly limited and include phase inversion (e.g. thermally induced, diffusion induced, etc.) and track-etching. While the desired pore size will vary with application, in many preferred embodiments the surface of the support has an average surface pore size of equal to or greater than 0.01 µm, (e.g. from 0.01 to 10 µm and more preferably from 0.1 to 5 µm). While various methods may be used to determine pore size, one preferred technique is size averaging of at least 10 but preferable 100 randomly selected pores using scanning electron microscopy over a field of 1 µm×1 µm of the surface. The support may be isotropic or anisotropic (e.g. Loeb-Sourirajan type or multi-layer composite-type). If the support includes multiple layers, the layers may include dissimilar compositions and/or porosities. Examples of applicable supports include porous polymeric membranes commonly used in micro and ultrafiltration. Commercially available supports can be obtained from a variety of commercial membrane producers including: Asahi, Koch, Memcor, Millipore, Norit and Pall.

The discriminating layer is preferably formed by sequentially applying immiscible coating solutions upon the support, wherein one of the coating solutions comprises: a) a block copolymer including: i) durable segments with reactive pendent groups and ii) sacrificial segments; and b) another solution comprises a crosslinking agent. Once coated, a reaction occurs between the crosslinking agent and the reactive pendent groups of the block copolymer. The reaction occurs at the interface between the two coating solutions and results in a crosslinked matrix comprising micro-domains of the sacrificial segments. By forming the crosslinked matrix upon the support, the reactive mixture is able to penetrate the surface of the support. Subsequent reaction produces a discriminating layer having a strong union with the support.

Although the coating steps need not follow a specific order, it is often preferable to first coat the crosslinking agent upon the support followed by the block copolymer. The coating solutions are preferably applied directly upon the support without the use of sacrificial substrates or coupling agents, (e.g. no use glass, silica, silica containing coupling agents, etc.). Coating can be accomplished by spraying, film coating, rolling, or through the use of a dip tank among other application techniques. Excess solution may be removed from the support by air knife, dryers, ovens and the like.

The selection of crosslinking agent is not particularly limited and representative species include monomers having multiple reactive groups including one or more functional groups reactive with the pendant reactive groups present on the durable segments of the block copolymer. Preferred species include polyfunctional isocyanates, alcohols, acids and amines. In one embodiment, the crosslinking agent is water soluble such that it may be evenly coated upon the support from an aqueous-based solution.

The selection of block copolymer is not particularly limited nor is the means of copolymerization. The durable segments may be derived by one or more monomers or oligomers and may include monoethylenically unsaturated monomers including acrylates (e.g. methyl acrylate, ethyl acrylate, tert-butyl acrylate, isobornyl acrylate, along with corresponding esters), styrene, vinyltoluene, vinylnaphthalene, and monovinylidene ring-containing nitrogen heterocyclic compounds such as vinylpyridine, and vinylpyrrolidone. Additional examples of suitable monoethylenically unsaturated monomers are described in U.S. Pat. No. 4,224, 415. The durable segments include with reactive pendent groups that are reactive with the crosslinking agent. While reactive pendent groups may be provided by way of post polymerization techniques, the groups are preferably incorporated into the durable segments during copolymerization, e.g. by way of using monomers including multiple reactive groups such as a monovinylidene monomer including one or more additional reactive groups. Representative examples include 4-vinyl-phenylisocyanate, 4-vinyl-phenylglycidyl ether, 4-vinyl-aniline, vinylphthalic anhydride, glycidyl methacrylate, hydroxyethylmethacrylate, and aminoethylmethacrylate.

The sacrificial segments should be capable of forming phase separated, micro-sized and even nano-sized domains and should be capable of being at least partially removed by way of etching. The sacrificial segments may be polymerized from monomers in-situ, pre-polymerized or partially polymerized prior to being added to the reaction mixture. In preferred embodiments, the polymer or oligomer includes a chain transfer agent (CTA) to facilitate copolymerization with the aforementioned monomers that ultimately form the durable segments of the block copolymer. In such embodiments, the block copolymer is formed by way of a reversible addition-fragmentation chain transfer (RAFT) copolymerization. While the invention is not limited to the formation of block copolymers via a RAFT mechanism, copolymers formed from RAFT mechanism result in a more crosslinked matrix as compared with copolymers formed via free radical polymerization. In an alternative embodiment, a chain transfer agent may be combined within the reaction mixture used to form the block copolymer. Representative classes of suitable CTAs include in general terms, those compounds possessing a thiocarbonylthio moiety in conjunction with a weak carbon-sulfur bond. Non-limiting, representative examples of such classes are: dithiobenzoates, dithiocarbamates, and trithiocarbonates.

One class of applicable materials for use as sacrificial segments includes aliphatic polyesters. By way of specific example, polylactic acid (PLA) is easily removed by base hydrolysis, e.g. washing with mild base. Other examples of sacrificial segments removable by chemical means include, but are not limited to, poly(caprolactone), poly(tetramethylene adipate) (PTMA), poly(1,4-butylene adipate), poly (trimethyllene adipate) (PTA), poly(pentamethyllene adipate) (PPA), poly(3-hydroxybutyrate) (PHB), poly(ethylene oxide), poly(propylene oxide), and poly(ethylene oxide-copropylene oxide). Examples of sacrificial segments removable thermally include poly(alpha-methylstyrene) and poly(alpha-ethylstyrene). Examples of sacrificial segments removable using radiation include poly(methyl methacrylate), poly(ethyl methacrylate), poly(propyl methacrylate) and the like.

In one preferred embodiment, the block copolymer comprises polystyrene (PS) segments and PLA segments.

The specific size and shape of the micro-domains can be modified by varying the overall molecular weight and weight ratios of the durable and sacrificial segments. For most applications, a weight ratio of durable to sacrificial segment is from about 1:6 to 2:1, and more commonly from about 1:3 to 1:1.

Once the crosslinked matrix is formed, at least a portion of the sacrificial segments are removed (e.g. by way of etching) to yield pores. Techniques for removing the sacrificial segment are not particularly limited and non-limiting examples include chemical (e.g. acid, base, ozone) thermal and irradiation. In preferred embodiments, the resulting pores are interconnected and have a mean flow size equal to or less than 0.5 µm, 0.1 µm, 0.05 µm or in some embodiments, equal to or less than 0.01 µm, as measured according to ASTM F316-03 (2011) Method B using a capillary flow porometer, (e.g. such as that available from Porous Materials, Inc., 20 Dutch Mill Rd., Ithaca, N.Y. 14850 USA). Preferred ranges of mean flow pore sizes include from 0.1 to 0.001 µm, 0.05 to 0.001 µm and 0.01 to 0.001 µm. Pore size distributions may be determined by various techniques including: small angle x-ray scattering, electron microscopy and ASTM E1343-90 (2001). Pore size distribution may also be characterized, for example, as the maximum pore size divided by the mean flow pore size (e.g. ASTM F316-03 (2011) Methods A and B). The maximum pore size (bubble point pore size) divided by the mean flow pore size ratio is preferably less than 20, more preferable less than 10, even more preferably less than 3. Alternatively, the pore size distribution can be characterized by the full width at half maximum (FWHM) divided by the mean of the pore size distribution curve (e.g. as measured the Barrett-Joyner-Halenda (BJH) Pore Size and Volume Analysis by adsorption and condensation of gases). The FWHM divided by the mean is preferably less than 1, more preferably less than 0.5, and even more preferably less than 0.2. Alternatively, a similar FWHM analysis measurement can be performed on a derivative curve derived from a rejection versus pore size curve obtained using a rejection method such as ASTM E1343-90 (2001), with pore size obtained from the radius of gyration associated with dextran molecular weight. Alternatively, the surface FWHM pore size distribution can be obtained by statistical analysis of the pores imaged by scanning electron microscopy.

The discriminating layer is preferably relatively thin as compared with the support, e.g. less than 20 µm, (e.g. from about 0.1 to 20 µm, and more preferably from about 0.5 to 5 µm). The present use of an interfacial reaction technique provides a means of achieving desired thicknesses not obtainable via traditional approaches.

A representative reaction scheme is provided below wherein sacrificial segments of a block copolymer are derived from polylactic acid (PLA). For example, hydroxyl-terminated PLA is prepared by aluminum catalyzed ring-opening polymerization of D,L-lactide. Then, S-1-dodecyl-S'—(R,R'-dimethyl-R"-acetic acid) trithiocarbonates (CTA), a carboxylic acid-containing chain transfer agent for reversible addition-fragmentation chain transfer (RAFT) polymerization, is coupled with the hydroxyl end via an acid chloride intermediate. PLA-CTA, styrene monomer (S) and 3-isocyanato-2-methyl-1-propene (IMP) are then copolymerized to form a block copolymer (PLA-b-P(S-co-IMP)

with styrene and IMP blocks forming the durable segments of the copolymer with isocyanate moieties serving as reactive pendant groups.

Representative reaction scheme:

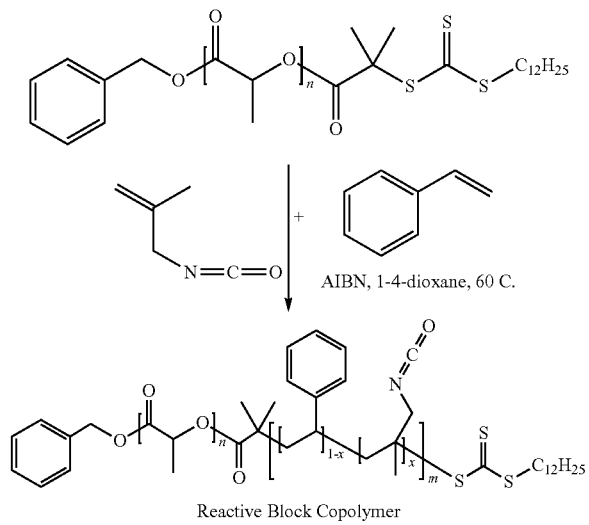

Reactive Block Copolymer

The reactive block copolymer may be coated from any suitable solvent, i.e. a solvent immiscible with the solution used to coat the crosslinking agent. In the reaction scheme illustrated above, dichloromethane may be used. After coating, micro-phase separation occurs between the durable and sacrificial segments of the block copolymer. Simultaneously, reaction between the crosslinking agent (e.g. polyfunctional amine) and the pendent reactive groups of the block copolymer (e.g. isocyanate moieties) produces a crosslinked matrix of durable segments. Given their low molecular weight (e.g. less than 100 Daltons), at least some of the reactive species (e.g. polyfunctional amine) penetrates the surface of the support prior to forming a crosslinked matrix. As a consequence, the resulting crosslinked matrix forms a strong union with the support.

While a variety of crosslinking agents may be used, a preferred class includes polyfunctional amine monomers. Representative polyfunctional amine monomers comprises at least two primary or secondary amino groups and may be aromatic (e.g., m-phenylenediamine, p-phenylenediamine, 1,3,5-triamino benzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diamino ethyl) amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as a polar solution (e.g. aqueous-based solution). The polar solution may contain from about 0.1 to about 20 weight percent and more preferably from about 0.5 to about 6 weight percent polyfunctional amine monomer. Once coated on the porous support, excess solution may be optionally removed.

In the reaction scheme described above, the reactive pendant groups of the block copolymer are isocyanates moieties. More generically, a wide range of so-called amine reactive groups may be used. As used herein, the term "amine reactive groups" refers to pendent functional groups that are reactive with the amine moieties of the polyfunctional amine monomer during the time period and conditions present during formation of the discriminating layer. This generally requires substantial reaction within a few seconds of contact at room temperature under standard atmospheric pressure. Representative examples of amine-reactive functional groups include: acyl halide (e.g. acid chloride), anhydride, isocyanate and epoxy. The block copolymer is preferably coated upon the support from a solution that is immiscible with the solution used to coat the polyfunctional amine monomer, e.g. a non-polar solution. As used herein, the term "immiscible" means that when combined, the solutions form multiple distinct phases. The block copolymer may be dissolved in a non-polar solvent in a range from about 0.01 to 10 weight percent, preferably 0.05 to 3 weight percent and may be delivered as part of a continuous coating operation. Suitable solvents are those which are capable of dissolving the block copolymer and which are immiscible with the coating solution used in connection with the crosslinking agent. For example, when water is selected to coat the crosslinking agent, the block copolymer may be coated using, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A representative solvent includes ISOPAR™ available from Exxon Chemical Company.

A preferred class of discriminating layers includes crosslinked polyamides formed by reaction of a polyfunctional amine and a block copolymer including reactive pendant acyl halide groups. As used herein, the term "polyamide" refers to a polymer in which amide linkages (—C(O)NH—) occur along the molecular chain.

For purposes of the present description, the term "block copolymer" refers to a polymer comprising two or more dissimilar polymer (e.g. homopolymer, copolymer) segments linked by covalent bonds. The union of the dissimilar segments may optionally include an intermediate non-repeat subunit, commonly referred to as a junction block. The block copolymer used in the present invention may contain any numbers of the polymeric block segments arranged in any manner (e.g. di-block, tri-block, multi-blocks, branched block, graft, linear star polymers, comb, block copolymers, gradient polymers, etc.). The block copolymer may have a linear or branched structure. Non-limiting examples of applicable block copolymers are illustrated by the following formulae:

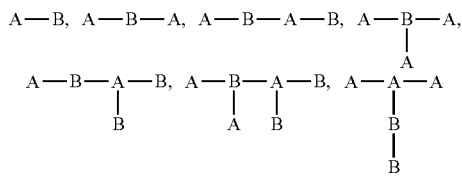

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. Stated ranges include end points.

The entire subject matter of each of the aforementioned patent documents is incorporated herein by reference.

The invention claimed is:

1. A method of making a composite membrane comprising the steps of forming a discriminating layer having a thickness of less than 20 μm upon a surface of a porous support by sequentially applying immiscible coating solutions upon the support, wherein:
   i) one coating solution comprises a crosslinking agent,
   ii) one coating solution comprises a block copolymer, wherein the block copolymer comprises durable segments that include reactive pendent groups and sacrificial segments and wherein the weight ratio of durable to sacrificial segments is from 1:6 to 2:1,
   iii) the reactive pendent groups react with the crosslinking agent to form a crosslinked matrix comprising microdomains of the sacrificial segments, and
   wherein said method comprises etching at least a portion of the sacrificial segments to yield pores having a mean flow pore size of from 0.1 to 0.001 μm.

2. The method of claim 1 wherein the crosslinking agent comprises a polyfunctional amine monomer.

3. The method of claim 1 wherein the sacrificial segments of the block copolymer comprise polylactic acid.

4. The method of claim 1 wherein the durable segments of the block copolymer comprise polystyrene.

5. The method of claim 1 wherein the reactive pendent groups of the block copolymer comprise at least one of: acyl halide, anhydride, epoxy and isocyanate.

6. The method of claim 1 wherein the discriminating layer comprises a crosslinked polyamide.

7. The method of claim 1 wherein the crosslinking agent includes a moiety selected from: isocyanates, alcohols, acids and amines.

* * * * *